(12) United States Patent
Miyazaki et al.

(10) Patent No.: US 12,467,538 B2
(45) Date of Patent: Nov. 11, 2025

(54) SLIDING COMPONENT

(71) Applicant: Eagle Industry Co., Ltd., Tokyo (JP)

(72) Inventors: Sayaka Miyazaki, Tokyo (JP); Hiroki Inoue, Tokyo (JP); Yuta Negishi, Tokyo (JP); Yuki Maetani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 233 days.

(21) Appl. No.: 17/433,561

(22) PCT Filed: Mar. 18, 2020

(86) PCT No.: PCT/JP2020/011926
§ 371 (c)(1),
(2) Date: Aug. 24, 2021

(87) PCT Pub. No.: WO2020/196145
PCT Pub. Date: Oct. 1, 2020

(65) Prior Publication Data
US 2022/0145992 A1 May 12, 2022

(30) Foreign Application Priority Data
Mar. 22, 2019 (JP) .................................. 2019-054193

(51) Int. Cl.
*F16J 15/34* (2006.01)
(52) U.S. Cl.
CPC ..................................... *F16J 15/34* (2013.01)
(58) Field of Classification Search
CPC .......................................................... F16J 15/34
See application file for complete search history.

(56) References Cited

U.S. PATENT DOCUMENTS

| 3,383,116 A | 5/1968 | Carter .............................. 277/96 |
| 3,527,465 A | 9/1970 | Guinard |

(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

Second Office Action issued in Chinese Patent Appln. Serial No. 201980007372.8, dated May 26, 2022, with English translation, 13 pages.

(Continued)

*Primary Examiner* — Vishal A Patel
(74) *Attorney, Agent, or Firm* — HAYES SOLOWAY P.C.

(57) ABSTRACT

A sliding component includes a plurality of dynamic pressure generation mechanisms circumferentially arranged on a sliding surface of the sliding component. Each dynamic pressure generation mechanism includes an introduction groove portion communicating with a sealing target fluid side through an opening portion of the introduction groove portion and a dynamic pressure generation groove portion communicating with the introduction groove portion and extending in a circumferential direction in which the sliding component is relatively rotated with respect to a mating sliding component. The introduction groove portion is partially defined by a boundary wall positioned between the introduction groove portion and the dynamic pressure generation groove portion. The boundary wall has an inclined surface where at least a portion of the boundary wall positioned on a side of the opening portion extends toward the sealing target fluid side and inclined to a side of the dynamic pressure generation groove portion.

6 Claims, 9 Drawing Sheets

(56) References Cited

U.S. PATENT DOCUMENTS

| | | | |
|---|---|---|---|
| 3,675,935 A | 7/1972 | Ludwig | F16J 15/342 |
| 3,695,789 A | 10/1972 | Jansson | F01C 21/003 |
| 3,704,019 A | 11/1972 | McHugh | 277/400 |
| 3,782,737 A | 1/1974 | Ludwig et al. | 277/27 |
| 3,870,382 A | 3/1975 | Reinhoudt | F16C 17/045 |
| 4,007,974 A | 2/1977 | Huber | F16C 17/045 |
| 4,056,478 A | 11/1977 | Capelli | C01M 5/00 |
| 4,071,253 A | 1/1978 | Heinen et al. | 277/3 |
| 4,120,544 A | 10/1978 | Huber | F16C 33/107 |
| 4,523,764 A | 6/1985 | Albers et al. | 277/3 |
| 4,889,348 A | 12/1989 | Amundson | 277/306 |
| 5,066,026 A | 11/1991 | Heck | F16J 15/3412 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,222,743 A * | 6/1993 | Goldswain | F16J 15/3412 |
| | | | 277/400 |
| 5,224,714 A | 7/1993 | Kimura | 277/400 |
| 5,368,314 A | 11/1994 | Victor | F16J 15/3412 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,744,094 B2 | 6/2010 | Yanagisawa | F16J 15/342 |
| 7,758,051 B2 | 7/2010 | Roberts-Haritonov | 277/401 |
| 7,931,277 B2 * | 4/2011 | Garrison | F16J 15/441 |
| | | | 277/400 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 8,757,632 B2 * | 6/2014 | Dobosz | F16J 15/3412 |
| | | | 277/400 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,347,566 B2 | 5/2016 | Tokunaga | F16J 15/3412 |
| 9,353,865 B2 | 5/2016 | Lattin | F16N 21/00 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/64 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,612,666 B2 | 4/2020 | Tokunaga | F16J 15/36 |
| 10,823,162 B2 | 11/2020 | Kume | F04B 27/1804 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 11,708,911 B2 | 7/2023 | Imura | F16J 15/34 |
| 2002/0014743 A1 | 2/2002 | Zheng | 277/358 |
| 2002/0093141 A1 | 7/2002 | Wang | F16J 15/34 |
| 2002/0109302 A1 | 8/2002 | Muraki | F16J 15/3412 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 * | 9/2011 | Vasagar | F16J 15/441 |
| | | | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2014/0159314 A1 | 6/2014 | Hosoe | F16J 15/34 |
| 2014/0197600 A1 | 7/2014 | Hosoe | F16J 15/342 |
| 2014/0203517 A1 * | 7/2014 | Ferris | F16J 15/3412 |
| | | | 277/400 |
| 2014/0217676 A1 | 8/2014 | Hosoe et al. | 277/350 |
| 2014/0319776 A1 | 10/2014 | Theike et al. | |
| 2015/0115537 A1 | 4/2015 | Tokunaga | F16J 15/3412 |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 * | 12/2015 | Tokunaga | F16J 15/342 |
| | | | 384/119 |
| 2016/0033045 A1 | 2/2016 | Itadani et al. | F16J 15/3412 |
| 2016/0097457 A1 | 4/2016 | Sun et al. | F16J 15/3412 |
| 2017/0175726 A1 | 6/2017 | Kume | F04B 27/1804 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0051809 A1 | 2/2018 | Yoshida | F16J 15/3412 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0364034 A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 105014489 A * | 11/2015 | B24B 19/02 |
| CN | 106029294 | 10/2016 | B23K 26/364 |
| CN | 205877184 | 1/2017 | F16J 15/16 |
| CN | 205877198 | 1/2017 | F16J 15/34 |

(56) References Cited

FOREIGN PATENT DOCUMENTS

| | | | |
|---|---|---|---|
| CN | 106439023 | 2/2017 | ............... F16J 15/16 |
| CN | 106763778 | 5/2017 | ............... F16J 15/16 |
| CN | 107489770 | 12/2017 | ............... F16J 15/34 |
| CN | 107906206 | 4/2018 | ............... F16J 15/34 |
| CN | 109237042 | 1/2019 | ............... F16J 15/34 |
| CN | 110770456 | 2/2020 | ............. F16C 33/12 |
| CN | 111656065 | 9/2020 | ............... F16J 15/34 |
| DE | 3223703 | 6/1982 | ............... F16J 15/34 |
| DE | 102008038396 | 2/2010 | |
| EP | 0369295 | 11/1988 | ............... F16J 15/34 |
| EP | 0518681 | 12/1992 | ............ G11B 15/60 |
| EP | 0637706 | 8/1993 | ............... F16J 15/34 |
| EP | 2138225 | 12/2009 | ............... B01J 13/20 |
| EP | 2754931 | 7/2014 | ............... F16J 15/34 |
| EP | 3112078 | 1/2017 | ......... B23K 26/364 |
| EP | 3196516 | 7/2017 | ............... F16J 15/34 |
| EP | 3217049 | 9/2017 | ............... F16J 15/34 |
| EP | 3396186 | 10/2018 | ............. F16C 33/10 |
| EP | 33396185 | 10/2018 | ............. F16C 27/04 |
| EP | 3575621 | 12/2019 | ............. F16C 33/10 |
| EP | 3575643 | 12/2019 | ............... F16J 15/34 |
| EP | 3650722 | 5/2020 | ............. F16C 33/12 |
| FR | 2342440 | 9/1997 | ............... F16J 15/34 |
| GB | 1509482 | 5/1978 | ............. F16C 33/10 |
| GB | 2263952 | 8/1993 | ............... F16J 15/34 |
| JP | S51-034974 | 3/1976 | |
| JP | S52-143571 | 10/1977 | ............... F16J 15/26 |
| JP | 57163770 | 10/1982 | ........... F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............... F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F26J 15/34 |
| JP | 2012-062534 | 3/2012 | |
| JP | 2012-122135 | 6/2012 | ............. C25D 15/02 |
| JP | 2013-213545 | 10/2013 | ............. F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| KR | 10-2017-0093349 | 8/2017 | ............... F04B 53/10 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F26J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F26J 15/34 |

OTHER PUBLICATIONS

U.S. Appl. No. 16/959,105, filed Jun. 29, 2020, Imura
U.S. Appl. No. 16/964,943, filed Jul. 24, 2020, Imura et al.
U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,281, filed Jul. 22, 2021, Suzuki.
U.S. Appl. No. 17/425,678, filed Jul. 23, 2021, Suzuki et al.

* cited by examiner

SLIDING COMPONENT

TECHNICAL FIELD

The present invention relates to sliding components that rotate relative to each other and are used for, for example, a shaft sealing device shaft-sealing a rotary shaft of a rotating machine in the automotive seal field, the general industrial machinery seal field, or another seal field or a bearing of a machine in the automotive bearing field, the general industrial machinery bearing field, or another bearing field.

BACKGROUND ART

A mechanical seal as an example of a shaft sealing device preventing sealing target liquid leakage includes a pair of annular sliding components rotating relative to each other and having sliding surfaces sliding with each other. In recent years and in such mechanical seals, it has been desired for environmental measures or the like to reduce the energy that is lost due to sliding. In this regard, the sliding surface of the sliding component may be provided with a positive pressure generation groove communicating with the high-pressure sealing target liquid side and blocked at one end on the sliding surface.

For example, in the mechanical seal that is illustrated in Patent Citation 1, a plurality of dynamic pressure generation mechanisms are circumferentially arranged side by side on the sliding surface of one sliding component and the dynamic pressure generation mechanism includes a radially extending introduction groove portion communicating with a sealing target liquid side and a dynamic pressure generation groove portion communicating with the introduction groove portion and extending in the direction of relative rotation. According to this, during the relative rotation of the sliding component, the sealing target liquid is introduced into the dynamic pressure generation groove portion through the introduction groove portion and the sealing target liquid concentrates on the wall portion of the relative rotation-direction end portion of the dynamic pressure generation groove portion. This leads to positive pressure generation and inter-sliding surface separation and a liquid film of the sealing target liquid is formed on the sliding surface. As a result, lubricity is improved and friction reduction is realized.

CITATION LIST

Patent Literature

Patent Citation 1: JP H5-60247 A (Page 3, FIG. 2)

SUMMARY OF INVENTION

Technical Problem

In this manner, in Patent Citation 1, the friction between the sliding components can be reduced by the sealing target fluid being supplied between the sliding components from the end point of the dynamic pressure generation groove. Meanwhile, when the sealing target fluid contains contamination, the contamination may stay in the introduction groove portion, may further enter the dynamic pressure generation groove portion through the introduction groove portion, and may cause stagnation, sedimentation, or wear in the vicinity of the blocked end point of the dynamic pressure generation groove portion in particular. Accordingly, this inter-sliding surface contamination may damage the sliding surface and adversely affect the performance of a rotating machine. It should be noted that "contamination" in the present application means "particulate foreign matter" such as polyfine particle-shaped conductive foreign matter.

The present invention has been made in view of such problems, and an object of the present invention is to provide a sliding component capable of keeping the lubrication performance and seal function of a sliding surface satisfactory by suppressing the stay of contamination mixed in an introduction groove portion and preventing the contamination from entering a dynamic pressure generation groove portion.

Solution to Problem

In order to solve the above problem, the sliding component according to the present invention is a sliding component formed in an annular shape and disposed at a relative rotation point of a rotating machine, including a plurality of dynamic pressure generation mechanisms circumferentially arranged on a sliding surface of the sliding component, each of the dynamic pressure generation mechanisms including an introduction groove portion communicating with a sealing target fluid side through an opening portion of the introduction groove portion and a dynamic pressure generation groove portion communicating with the introduction groove portion and extending in a circumferential direction in which the sliding component is relatively rotated with respect to a mating sliding component, wherein the introduction groove portion is partially defined by a boundary wall positioned between the introduction groove portion and the dynamic pressure generation groove portion, and the boundary wall has an inclined surface where at least a portion of the boundary wall positioned on a side of the opening portion extends toward the sealing target fluid side so as to be inclined to a side of the dynamic pressure generation groove portion. According to the aforesaid feature of the present invention, during the relative rotation of the sliding components, contamination mixed in the introduction groove portion along with the sealing target fluid is easily discharged to the sealing target fluid side along the inclined surface of the boundary wall, and thus it is possible to prevent the contamination from entering the dynamic pressure generation groove portion via the introduction groove portion and the lubrication performance and seal function of the sliding surface can be kept satisfactory.

It may be preferable that the inclined surface is formed of a flat surface from the side of the dynamic pressure generation groove portion toward the sealing target fluid side. According to this preferable configuration, the contamination mixed in the introduction groove portion is easily discharged to the outside along the inclined surface since the inclined surface is flat.

It may be preferable that the boundary wall has a radial surface radially extending on the side of the dynamic pressure generation groove portion as compared with the inclined surface. According to this preferable configuration, the sealing target fluid proceeds to the dynamic pressure generation groove portion through the radial surface extending in the radial direction, and thus the function of the dynamic pressure generation groove portion is not impaired.

It may be preferable that, the introduction groove portion is formed such that a circumferential width of the introduction groove portion on the side of the opening portion communicating with the sealing target fluid side is narrower than a circumferential width of the introduction groove portion on the side of the dynamic pressure generation groove. According to this preferable configuration, the contamination that flows with rotation is unlikely to flow in since the opening portion is narrow.

It may be preferable that the introduction groove portions arranged in the circumferential direction mutually communicate via an endlessly extending annular groove formed in the sliding surface. According to this preferable configuration, the fluidity of the contamination mixed in the introduction groove portion is further enhanced and any of the plurality of introduction groove portions arranged side by side in the circumferential direction is easily discharged as a discharge groove portion.

It may be preferable that the introduction groove portion communicates with an outer diameter side of the sliding component which is the sealing target fluid side. According to this preferable configuration, centrifugal force acts in the outer diameter direction, and thus the mixed contamination is easily removed.

It may be preferable that a discharge groove portion communicating with the introduction groove portion and communicating with the sealing target fluid side is provided. According to this preferable configuration, the fluidity of the contamination mixed in the introduction groove portion along with the sealing target fluid can be enhanced and the contamination can be discharged to the sealing target fluid side from the discharge groove portion as well.

It may be preferable that the discharge groove portion communicating with the introduction groove portion is an introduction groove portion having the discharge function of the dynamic pressure generation mechanism arranged side by side downstream of the introduction groove portion. According to this preferable configuration, it is possible to achieve a compact structure by using the discharge groove portion communicating with the introduction groove portion as the introduction groove portion on the downstream side thereof as well.

DESCRIPTION OF EMBODIMENTS

Figure 1:
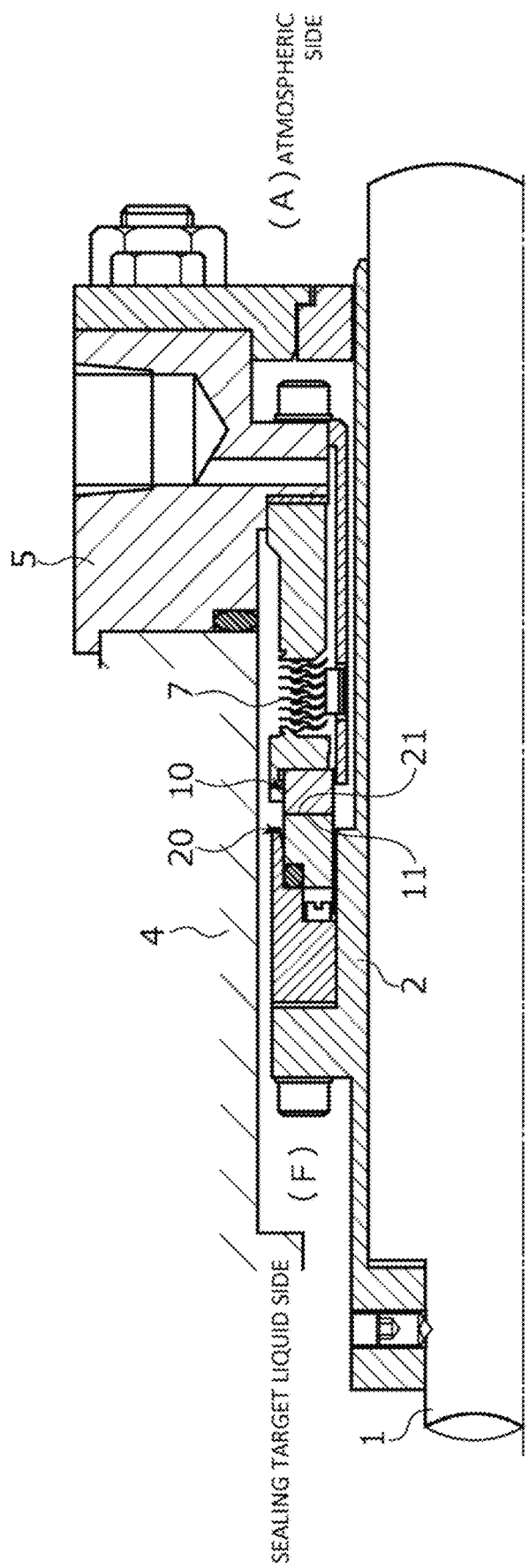
FIG. 1 is a vertical cross-sectional view illustrating the mechanical seal including a sliding component according to a first embodiment of the present invention.

Modes for implementing the sliding component according to the present invention will be described below based on embodiments.

First Embodiment

The sliding component according to the first embodiment of the present invention will be described with reference to FIGS. 1 to 5. It should be noted that a mode in which the sliding component is a mechanical seal will be described as an example in the present embodiment. In addition, in the following description, the outer diameter side of the sliding component constituting the mechanical seal is a sealing target liquid side (i.e., high-pressure side) and the inner diameter side is an atmospheric side (i.e., leak side, low-pressure side). It should be noted that the present invention is not limited thereto, the sealing target liquid side may be the low-pressure side and the leak side may be the high-pressure side, and the sealing target fluid is not limited to a liquid and may be a gas, examples of which include the atmosphere. In addition, for convenience of description, dots may be added to, for example, the grooves formed in the sliding surface in the drawings.

The mechanical seal for general industrial machine illustrated in FIG. 1 is an inside-type mechanical seal that seals a sealing target liquid F to leak toward the atmospheric side from the sealing target liquid side of sliding surfaces 11 and 21. The mechanical seal mainly includes a rotating seal ring 20, which is an annular sliding component provided on a rotary shaft 1 in a state of being rotatable together with the rotary shaft 1 via a sleeve 2, and an annular stationary seal ring 10, which is a sliding component provided on a seal cover 5 fixed to a housing 4 of an attachment target device in a non-rotating state and a state of being movable in the axial direction. The sliding surface 11 of the stationary seal ring 10 and the sliding surface 21 of the rotating seal ring 20 slide closely with each other by a bellows 7 urging the stationary seal ring 10 in the axial direction. It should be noted that the sliding surface 21 of the rotating seal ring 20 may form a flat surface or may be provided with a recessed portion.

The stationary seal ring 10 and the rotating seal ring 20 are typically formed of a combination of SiC (as an example of hard material) or a combination of SiC (as the example of hard material) and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
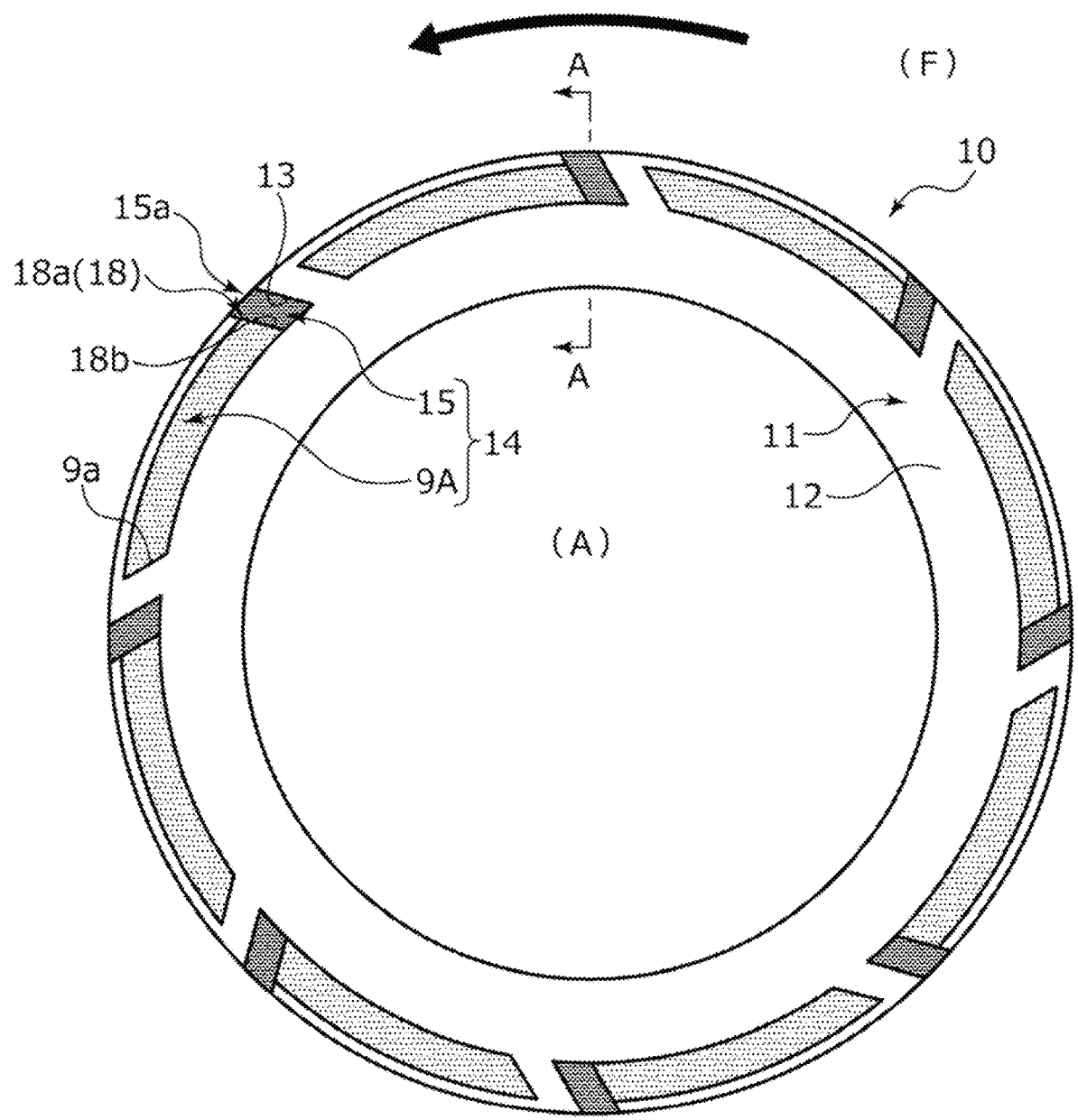
FIG. 2 is a diagram in which the sliding surface of a stationary seal ring is viewed from the axial direction in the first embodiment.

As illustrated in FIG. 2, the rotating seal ring 20 slides relative to the stationary seal ring 10 as indicated by the arrow and a plurality of dynamic pressure generation mechanisms 14 are evenly arranged in the circumferential direction of the stationary seal ring 10 on the sliding surface 11 of the stationary seal ring 10. The part of the sliding surface 11 other than the dynamic pressure generation mechanism 14 is a land 12 forming a flat surface. To be more specific, the part of the sliding surface 11 other than the dynamic pressure generation mechanism 14 is, for example, the part on the atmospheric side as compared with the dynamic pressure generation mechanism 14 and the part between the dynamic pressure generation mechanisms 14 adjacent to each other in the circumferential direction.

Figure 3:
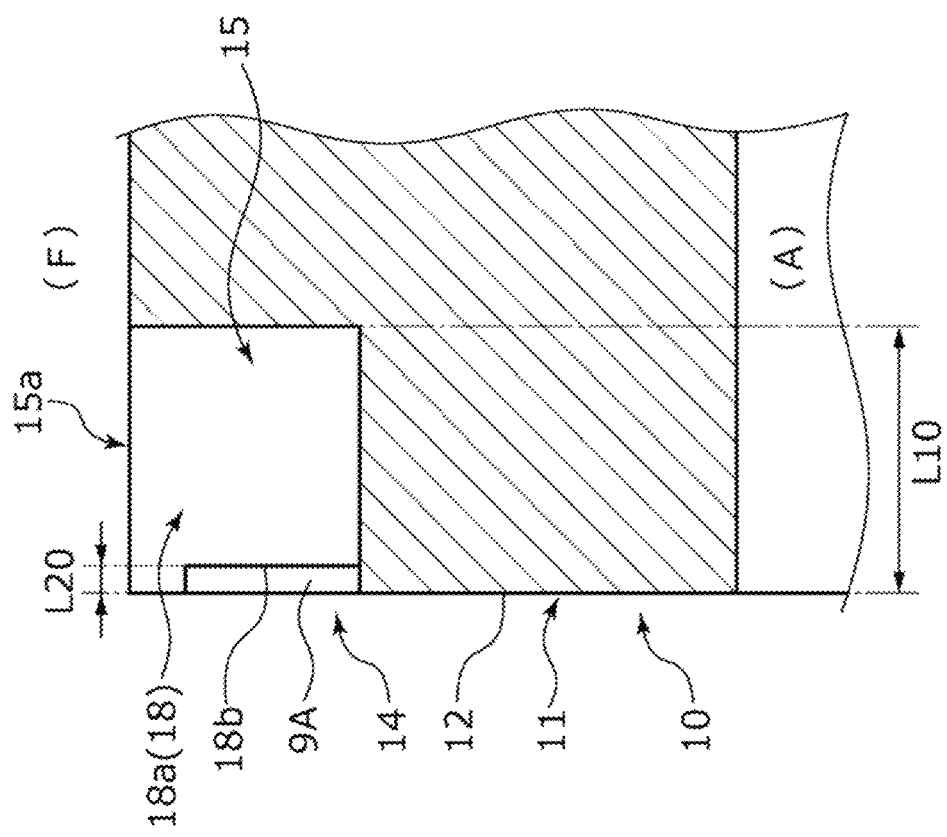
FIG. 3 is a cross-sectional view taken along line A-A of FIG. 2.
Figure 4:
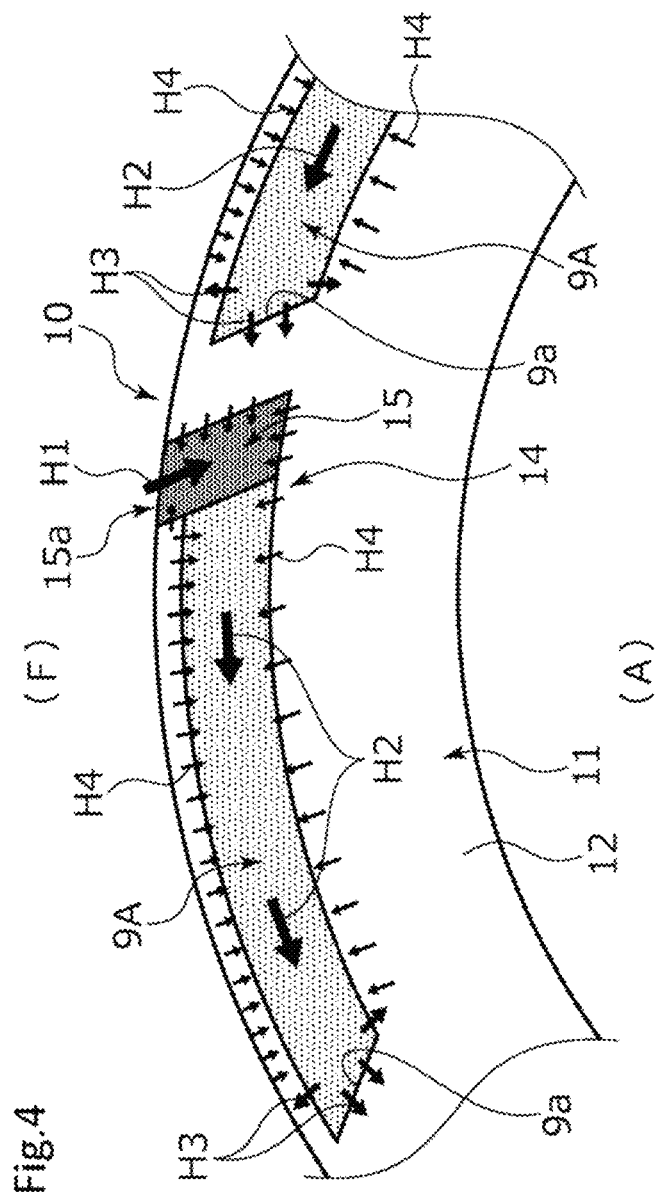
FIG. 4 is an enlarged view of a main part of the sliding surface of the stationary seal ring in the first embodiment.

Next, the dynamic pressure generation mechanism 14 will be outlined with reference to FIGS. 2 to 4. It should be noted that the left side of the page of FIG. 4 is the downstream side of the sealing target liquid F flowing in a Rayleigh step 9A (described later) and the right side of the page of FIG. 4 is the upstream side of the sealing target liquid F flowing in the Rayleigh step 9A in the following description, when the stationary seal ring 10 and the rotating seal ring 20 are relatively rotated.

The dynamic pressure generation mechanism 14 includes an introduction groove portion 15 provided with an opening portion 15a communicating with the sealing target liquid F side and extending to the atmospheric side and the Rayleigh step 9A as a dynamic pressure generation groove portion circumferentially extending concentrically with the stationary seal ring 10 toward the downstream side from the atmosphere-side end portion of the introduction groove portion 15. In addition, the atmosphere-side end portion of the introduction groove portion 15 is blocked and the atmosphere-side end surface thereof is continuous with the atmosphere-side end surface of the Rayleigh step 9A. In other words, by the introduction groove portion 15 and the Rayleigh step 9A, the dynamic pressure generation mechanism 14 has a substantially L shape when the sliding surface 11 is viewed from the orthogonal direction.

In addition, the introduction groove portion 15 of the first embodiment extends in the outer diameter direction so as to be inclined toward the Rayleigh step 9A with reference to the radial direction of the stationary seal ring 10. In addition, a boundary wall 18 constituting the introduction groove portion 15 and positioned on the boundary side in relation to the Rayleigh step 9A includes an inclined surface 18a extending flat over the entire surface thereof and inclined to the Rayleigh step 9A side with reference to the radial direction from the Rayleigh step 9A side toward the opening portion 15a side, that is, an inclined surface 18a having an outer diameter side positioned downstream of the inner diameter side from the inner diameter side toward the outer diameter side. The inclined surface 18a includes a depth-direction step 18b formed at the communication part between the introduction groove portion 15 and the Rayleigh step 9A. Further, the introduction groove portion 15 is provided with a facing wall 13 facing the boundary wall 18 in parallel on the upstream side. It should be noted that the inclined surface 18a is not limited to the flat shape and the inclined surface 18a may have the shape of a curved surface curved in a concave or convex shape.

In addition, in the Rayleigh step 9A, a wall portion 9a inclined with respect to the rotation direction is formed in the downstream-side end portion so as to correspond to the introduction groove portion 15 inclined as described above. It should be noted that the wall portion 9a is not limited to being inclined in the rotation direction. For example, the wall portion 9a may be orthogonal to the rotation direction or may be formed in a staircase shape.

In addition, a depth dimension L10 of the introduction groove portion 15 is deeper than a depth dimension L20 of the Rayleigh step 9A (L10>L20). Specifically, the depth dimension L10 of the introduction groove portion 15 in the first embodiment is formed to be 100 μm and the depth dimension L20 of the Rayleigh step 9A is formed to be 5 μm. In other words, the depth-direction step 18b is formed between the introduction groove portion 15 and the Rayleigh step 9A by the side surface of the introduction groove portion 15 on the downstream side and the bottom surface of the Rayleigh step 9A. It should be noted that the depth dimensions of the introduction groove portion 15 and the Rayleigh step 9A can be freely changed insofar as the depth dimension of the introduction groove portion 15 is formed deeper than the depth dimension of the Rayleigh step 9A and it is preferable that the dimension L10 is at least five times the dimension L20.

It should be noted that the bottom surface of the Rayleigh step 9A forms a flat surface and is formed parallel to the land 12 and yet does not hinder the flat surface being provided with a fine recess or being formed so as to be inclined with respect to the land 12. Further, each of the two circular-arc-shaped surfaces of the Rayleigh step 9A extending in the circumferential direction is orthogonal to the bottom surface of the Rayleigh step 9A. In addition, although the bottom surface of the introduction groove portion 15 forms a flat surface with a uniform depth and is formed parallel to the land 12, the bottom surface of the introduction groove portion 15 does not hinder the flat surface being provided with a fine recess or being formed so as to be inclined with respect to the land 12. For example, the bottom surface of the introduction groove portion 15 may be configured to be tapered or stepped so as to become shallow from the opening portion 15a on the sealing target liquid side toward the Rayleigh step 9A on the atmospheric side. Further, each of the two flat surfaces extending to the opening portion 15a of the introduction groove portion 15 is orthogonal to the bottom surface of the introduction groove portion 15.

Next, the operation of the stationary seal ring 10 and the rotating seal ring 20 during the relative rotation will be described. First, during the non-operation of a general industrial machine and non-rotation of the rotating seal ring 20, capillarity causes the sealing target liquid F on the sealing target liquid side as compared with the sliding surfaces 11 and 21 to slightly enter between the sliding surfaces 11 and 21 and the dynamic pressure generation mechanism 14 is filled with the sealing target liquid F that has flowed in from the sealing target liquid side in the opening portion 15a of the introduction groove portion 15. It should be noted that the sealing target liquid F is higher in viscosity than a gas and thus the amount of leakage from the dynamic pressure generation mechanism 14 to the atmospheric side is small when the general industrial machine is stopped.

When the rotating seal ring 20 rotates relative to the stationary seal ring 10 (see the black arrow in FIG. 2) from the stopped state of the general industrial machine, the sealing target liquid F on the sealing target liquid side is introduced from the introduction groove portion 15 as indicated by an arrow H1 in FIG. 4 and the Rayleigh step 9A causes the sealing target liquid F to follow and move in the rotation direction of the rotating seal ring 20 as indicated by an arrow H2. This leads to dynamic pressure generation in the Rayleigh step 9A. It should be noted that the pressure gradually decreases toward the upstream side of the Rayleigh step 9A.

The pressure is highest in the vicinity of the wall portion 9a, which is the downstream-side end portion of the Rayleigh step 9A, the sliding surfaces 11 and 21 are separated from each other, a liquid film of the sealing target liquid F is formed on the sliding surface 11, and the sealing target liquid F flows out from the vicinity of the wall portion 9a to the periphery as indicated by an arrow H3. According to this, the liquid film of the sealing target liquid F is formed in the vicinity of the wall portions 9a, 9a, . . . of a plurality of the Rayleigh steps 9A, 9A, . . . and thus so-called fluid lubrication occurs between the sliding surfaces 11 and 21, lubricity is improved, and friction reduction is realized. At this time, since the pressure is particularly high on the downstream side of the Rayleigh step 9A as described above, the sealing target liquid F in the vicinity of the Rayleigh step 9A does not substantially infiltrate into the Rayleigh step 9A, which is indicated by an arrow H4.

Figure 5:
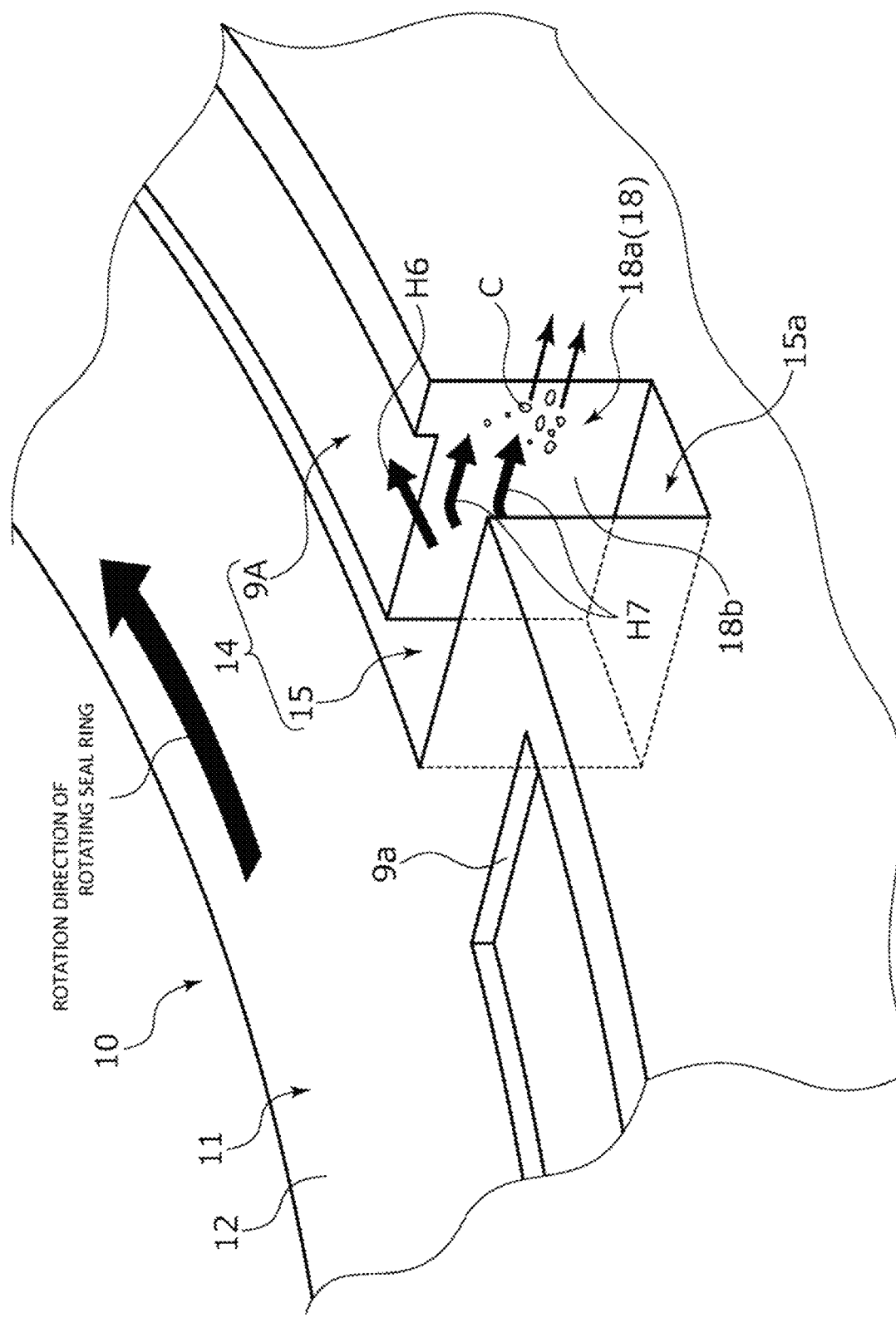
FIG. 5 is a perspective view illustrating a situation in which contamination mixed in an introduction groove portion is discharged in the first embodiment.

Next, the operation of discharging contamination C mixed in the introduction groove portion 15 will be described. As illustrated in FIG. 5, when the rotating seal ring 20 rotates relative to the stationary seal ring 10 with the dynamic pressure generation mechanism 14 filled with the sealing target liquid F, the sealing target liquid F in the dynamic pressure generation mechanism 14 moves to the downstream side in the circumferential direction. At this time, a flow to enter the Rayleigh step 9A is generated, as indicated by an arrow H6, as for the sealing target liquid F on the surface side facing the rotating seal ring 20. Meanwhile, as for the sealing target liquid F on the bottom surface side of the introduction groove portion 15 larger in dent amount than the bottom surface of the Rayleigh step 9A, a flow to move to the sealing target liquid side along the inclined boundary wall 18 is generated, as indicated by an arrow H7, while the step 18b blocks infiltration into the Rayleigh step 9A. By riding this flow indicated by the arrow H7, the contamination C mixed in the vicinity of the opening portion 15a of the introduction groove portion 15 is discharged from the introduction groove portion 15 to the sealing target liquid side outside the stationary seal ring 10. As described above, most of the contamination C is discharged to the outside of the introduction groove portion 15 without being mixed into the Rayleigh step 9A. It should be noted that the contamination C goes over the land 12 from the wall portion 9a and is discharged to the outside along the boundary wall 18 formed in the introduction groove portion 15 arranged side by side downstream of the Rayleigh step 9A even in a case where a very small amount of the contamination C is mixed into the Rayleigh step 9A.

As described above, the boundary wall 18 positioned on the boundary side of the introduction groove portion 15 in relation to the Rayleigh step 9A has the inclined surface 18a where at least the opening portion 15a side of the boundary wall 18 is inclined to the Rayleigh step 9A side with reference to the radial direction and extends to the sealing target liquid side. Accordingly, during the relative rotation of the stationary seal ring 10 and the rotating seal ring 20, the contamination C mixed in the introduction groove portion 15 along with the sealing target liquid F is easily discharged to the sealing target liquid side along the inclined surface 18a of the boundary wall 18, and thus it is possible to prevent the contamination C from entering the Rayleigh step 9A via the introduction groove portion 15 and the lubrication performance and seal function of the sliding surfaces 11 and 21 can be kept satisfactory.

In addition, the inclined surface 18a is formed of a flat surface from the Rayleigh step 9A side toward the sealing target liquid side, and thus the contamination C mixed in the introduction groove portion 15 is more easily discharged to the outside along the flat inclined surface 18a.

In addition, in the present embodiment, the mechanical seal is an inside-type mechanical seal in which the high-pressure sealing target liquid F is on the sealing target liquid side of the sliding surface and the introduction groove portion 15 communicates with the sealing target liquid and outer diameter sides. As a result, centrifugal force acts in the outer diameter direction, and thus the mixed contamination C is easily removed.

Figure 6:
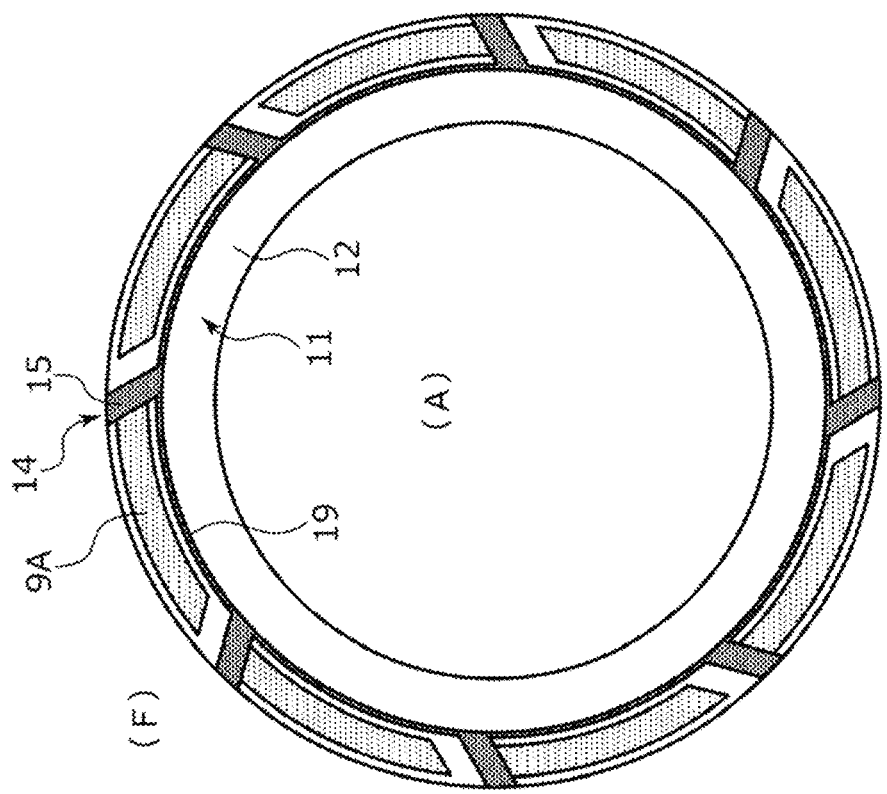
FIG. 6 is an explanatory diagram illustrating a first modification example of the first embodiment.

Next, a modification example will be described. As illustrated in FIG. 6, a plurality of the introduction groove portions 15, 15, . . . of a first modification example, which are arranged side by side along the circumferential direction, mutually communicate via an endlessly extending annular groove 19. According to this, the fluidity of the contamination C mixed in the introduction groove portion 15 can be further enhanced and the contamination C can be discharged from any of the introduction groove portions 15 arranged side by side in the circumferential direction. It should be noted that the depth dimension of the annular groove 19 is substantially equal to the depth dimension of the introduction groove portion 15. Further, the annular groove 19 is not limited to being endless and at least two introduction groove portions 15, 15 arranged side by side may be arranged so as to communicate with each other.

Figure 7:
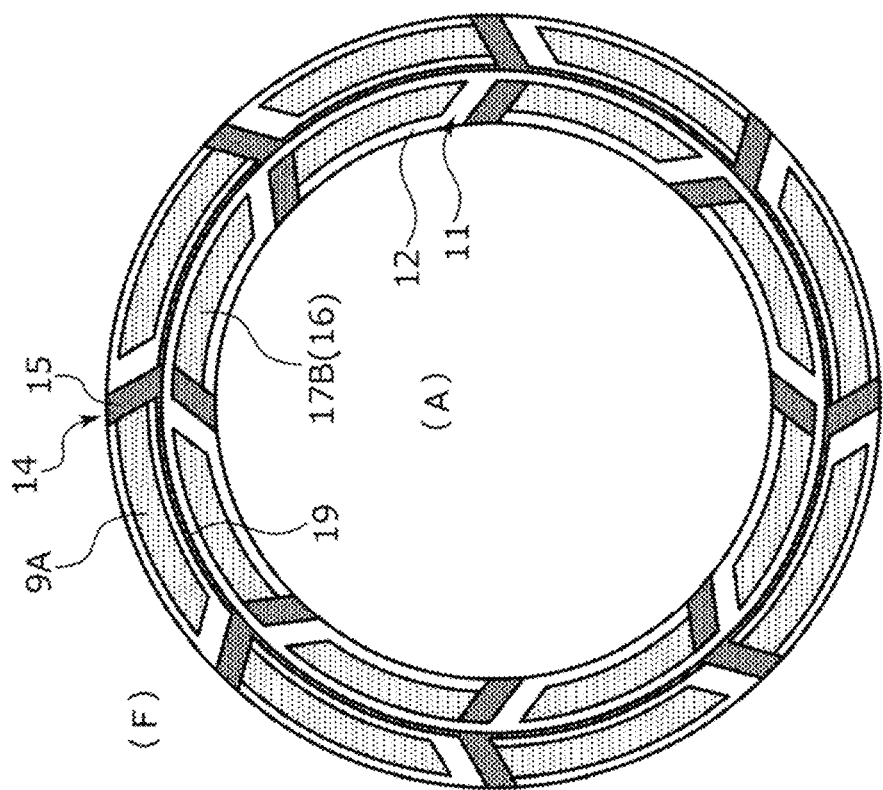
FIG. 7 is an explanatory diagram illustrating a second modification example of the first embodiment.

In addition, as illustrated in FIG. 7, the sliding surface 11 of a second modification example, which is on the atmospheric side as compared with the annular groove 19, is provided with a dynamic pressure generation mechanism 16 having a reverse Rayleigh step 17B. According to this, when the rotating seal ring 20 rotates relative to the stationary seal ring 10 and negative pressure is generated on the upstream side of the reverse Rayleigh step 17B, the reverse Rayleigh step 17B suctions the sealing target liquid F flowing out to the atmospheric side and the leakage of the sealing target liquid F to the atmosphere can be reduced as a result. It should be noted that the present invention is not limited to the structure illustrated in FIG. 7 and a negative pressure generation mechanism may be configured that is capable of generating negative pressure on the atmospheric side as compared with the annular groove 19 when the stationary seal ring 10 is relatively rotated.

As described above, in the first and second modification examples, an introduction groove portion extends that has a discharge function of communicating with the introduction groove portion 15 and communicating with the sealing target liquid side, and thus the fluidity of the contamination C mixed in the introduction groove portion 15 along with the sealing target liquid F is enhanced and the contamination C can be discharged from the discharge groove portion as well.

In addition, the introduction groove portion having the discharge function of communicating with the introduction groove portion 15 is the introduction groove portion 15 arranged side by side downstream of the introduction groove portion 15, and thus it is possible to achieve a compact structure by using the introduction groove portion having the discharge function as the introduction groove portion 15 on the downstream side thereof as well.

In addition, the plurality of introduction groove portions 15 arranged side by side along the circumferential direction mutually communicate via the endlessly extending annular groove 19, and thus the fluidity of the contamination C mixed in the introduction groove portion 15 is further enhanced and any of the plurality of introduction groove portions 15 arranged side by side in the circumferential direction is easily discharged as the discharge groove portion.

Second Embodiment

Next, the sliding component according to the second embodiment of the present invention will be described with reference to FIG. 8. It should be noted that configurations identical to those of the first embodiment will not be described below so that redundancy can be avoided.

Figure 8:
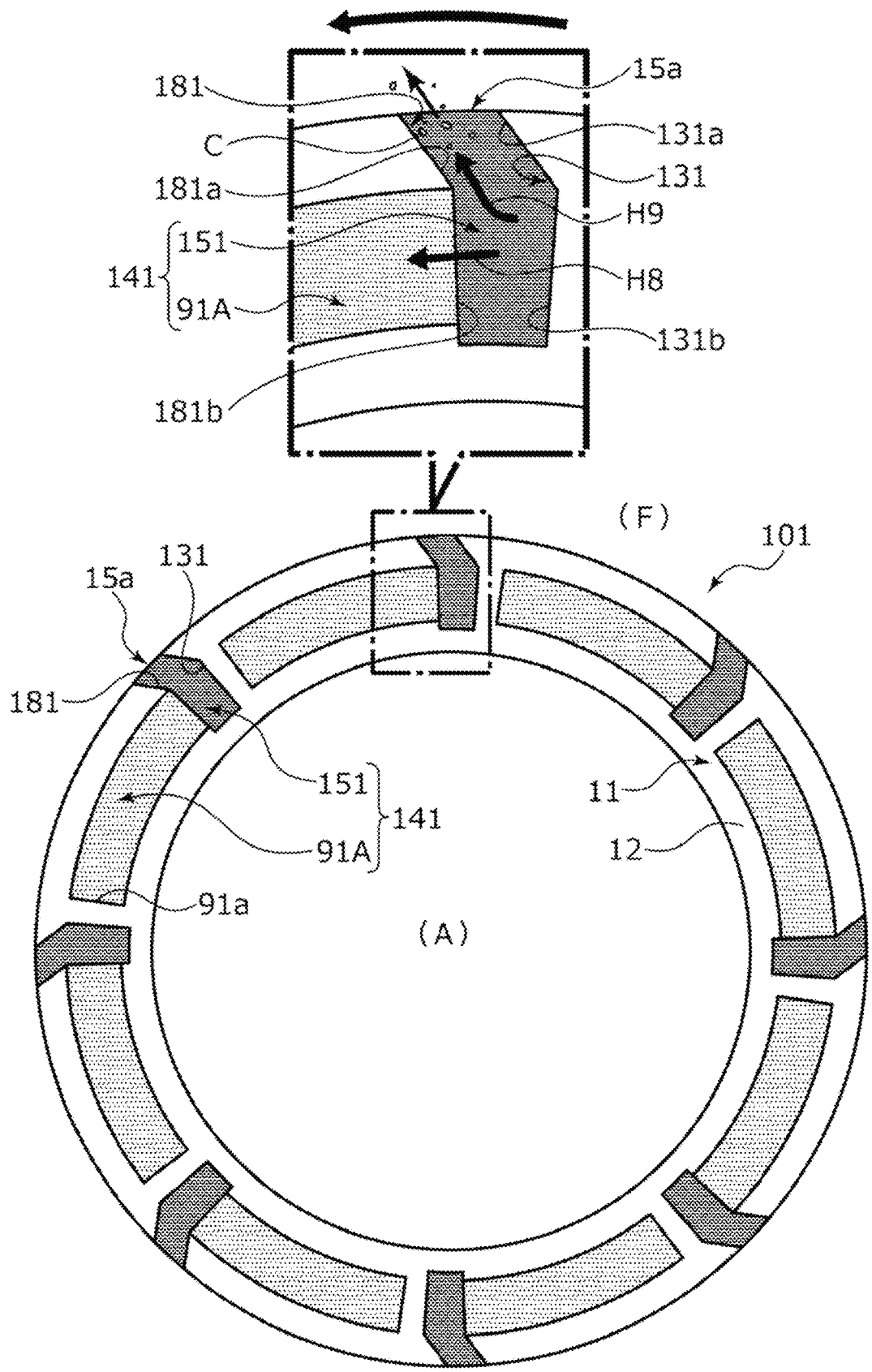
FIG. 8 is a diagram in which the sliding surface of the stationary seal ring as a sliding component according to a second embodiment of the present invention is viewed from the axial direction.

As illustrated in FIG. 8, a dynamic pressure generation mechanism 141 provided in a stationary seal ring 101 includes an introduction groove portion 151 and a Rayleigh step 91A. In addition, the atmosphere-side end portion of the introduction groove portion 151 is blocked and the atmosphere-side end surface thereof is positioned on the atmospheric side as compared with the atmosphere-side end surface of the Rayleigh step 91A. A boundary wall 181 constituting the introduction groove portion 151 and positioned on the boundary side in relation to the Rayleigh step 91A includes an inclined surface 181a extending in the outer diameter direction so as to be inclined toward the Rayleigh step 91A with reference to the radial direction of the stationary seal ring 101 from the sealing target liquid-side end portion of the Rayleigh step 91A and a step 181b as a radial surface extending in the radial direction on the Rayleigh step 91A side as compared with the inclined surface 181a. Likewise, a facing wall 131 is provided with an inclined surface 131a parallel to the inclined surface 181a of the boundary wall 181 and a radial surface 131b parallel to the step 181b.

In addition, in the Rayleigh step 91A, a wall portion 91a orthogonal to the rotation direction is formed in the downstream-side end portion in association with the step 181b and the radial surface 131b of the introduction groove portion 151. It should be noted that the wall portion 91a is not limited to being orthogonal to the rotation direction. For example, the wall portion 91a may be inclined with respect to the rotation direction or may be formed in a staircase shape.

It should be noted that a plurality of the introduction groove portions 151, 151, . . . arranged side by side along the circumferential direction mutually communicate via an endlessly extending annular groove. Accordingly, the fluidity of the contamination C mixed in the introduction groove portion 151 may be further enhanced and any of the plurality of introduction groove portions 151 arranged side by side in the circumferential direction may be easily discharged as a discharge groove portion.

As described above, the boundary wall 181 has the step 181b as a radial surface extending in the radial direction on the Rayleigh step 91A side as compared with the inclined surface 181a. As a result, the sealing target liquid F proceeds to the Rayleigh step 91A through the step 181b extending in the radial direction, and thus the function of the Rayleigh step 91A groove portion is not impaired.

Next, the operation of discharging the contamination C mixed in the introduction groove portion 151 will be described. As illustrated in the enlarged view of FIG. 8, when the rotating seal ring 20 rotates relative to the stationary seal ring 101 with the dynamic pressure generation mechanism 141 filled with the sealing target liquid F, the sealing target liquid F in the dynamic pressure generation mechanism 141 moves to the downstream side in the circumferential direction. At this time, a flow to infiltrate into the Rayleigh step 91A is generated, as indicated by an arrow H8, as for the sealing target liquid F on the surface side facing the rotating seal ring 20. Meanwhile, as for the sealing target liquid F on the bottom surface side as compared with the bottom surface of the Rayleigh step 91A, the flow that is indicated by an arrow H9 and to move to the sealing target liquid side along the inclined surface 181a inclined to the Rayleigh step 91A side with reference to the radial direction is generated while the step 181b blocks infiltration into the Rayleigh step 91A as indicated by the arrow H9. By riding this flow indicated by the arrow H9, the contamination C mixed in the vicinity of the opening portion 15a of the introduction groove portion 151 is discharged to the sealing target liquid side of the introduction groove portion 151. As described above, most of the contamination C is discharged to the outside of the introduction groove portion 151 without being mixed into the Rayleigh step 91A, and yet the contamination C goes over the land 12 from the wall portion 91a and is discharged along the inclined surface 181a formed in the introduction groove portions 151 arranged side by side downstream of the Rayleigh step 91A even in a case where a very small amount of the contamination C is mixed into the Rayleigh step 91A.

Third Embodiment

Next, the sliding component according to the third embodiment of the present invention will be described with reference to FIG. 9. It should be noted that configurations identical to those of the second embodiment will not be described below so that redundancy can be avoided.

Figure 9:
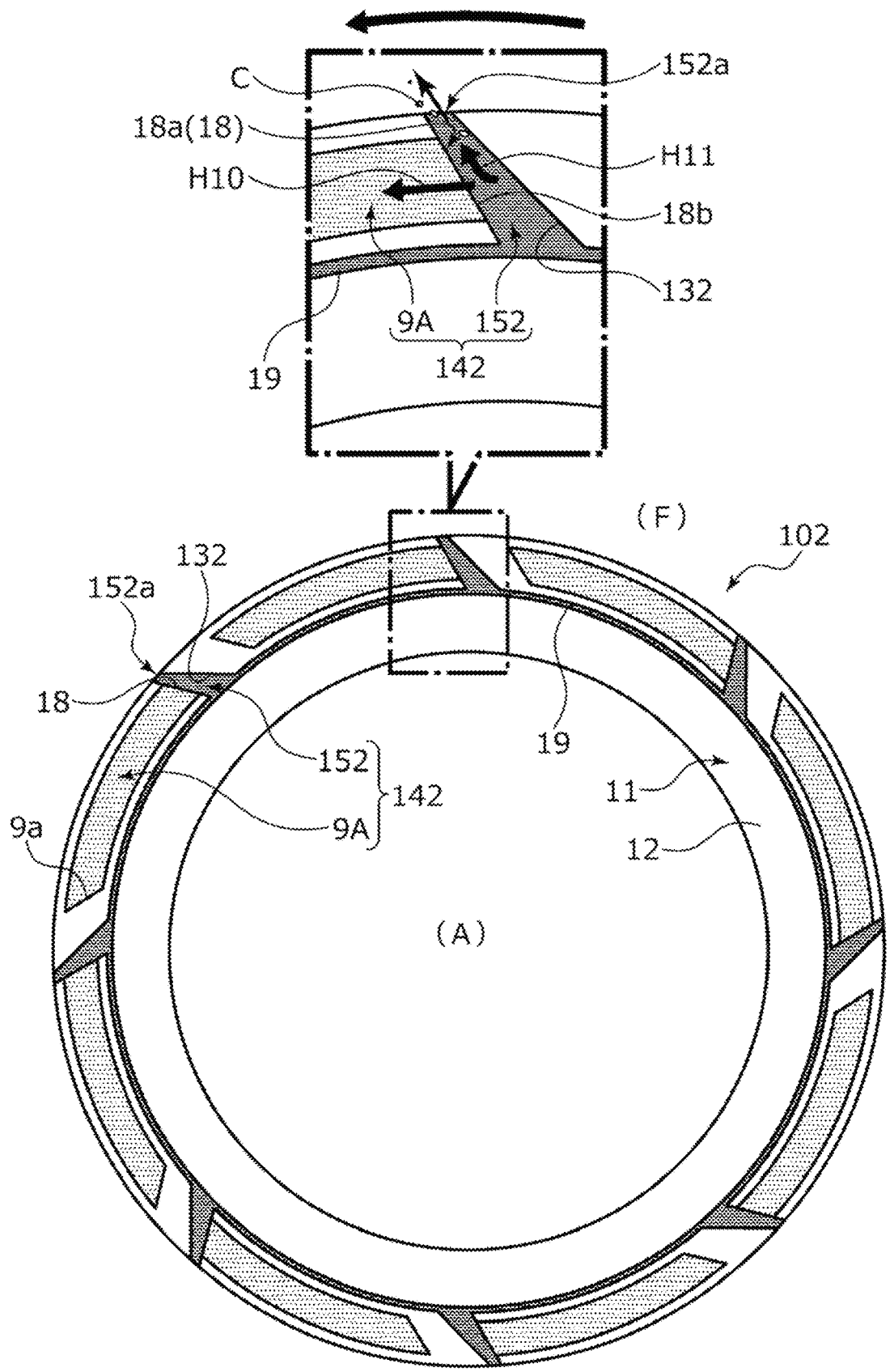
FIG. 9 is a diagram in which the sliding surface of the stationary seal ring as a sliding component according to a third embodiment of the present invention is viewed from the axial direction.

As illustrated in FIG. 9, a dynamic pressure generation mechanism 142 provided in a stationary seal ring 102 includes an introduction groove portion 152 and the Rayleigh step 9A and the introduction groove portion 152 has an atmosphere-side end portion communicating with the annular groove 19. The boundary wall 18 and a facing wall 132 constitute the introduction groove portion 152, the boundary wall 18 has the inclined surface 18a provided with the step 18b, and the facing wall 132 is inclined to the Rayleigh step 9A side as compared with the boundary wall 18 and extends to the sealing target liquid side.

In addition, in the Rayleigh step 9A, the wall portion 9a inclined with respect to the rotation direction is formed in the downstream-side end portion in association with the introduction groove portion 152 inclined as described above. It should be noted that the wall portion 9a is not limited to being inclined in the rotation direction. For example, the wall portion 9a may be orthogonal to the rotation direction or may be formed in a staircase shape.

It should be noted that a plurality of the introduction groove portions 152, 152, . . . arranged side by side along the circumferential direction mutually communicate via the endlessly extending annular groove 19. Accordingly, the fluidity of the contamination C mixed in the introduction groove portion 151 is further enhanced and any of the plurality of introduction groove portions 151 arranged side by side in the circumferential direction is easily discharged as a discharge groove portion, and yet the present invention is not limited thereto and the annular groove 19 may not be provided.

As described above, the introduction groove portion 152 is formed such that an opening portion 152a side communicating with the sealing target liquid side is narrower than the Rayleigh step 9A side, and thus the opening portion 15a is narrow, the sealing target liquid F easily flows in with static pressure, and the contamination C that flows due to dynamic pressure attributable to rotation is unlikely to flow in.

Next, the operation of discharging the contamination C mixed in the introduction groove portion 152 will be described. As illustrated in the enlarged view of FIG. 9, when the rotating seal ring 20 rotates relative to the stationary seal ring 102 with the dynamic pressure generation mechanism 142 filled with the sealing target liquid F, the sealing target liquid F in the dynamic pressure generation mechanism 142 moves to the downstream side in the circumferential direction. At this time, a flow to infiltrate into the Rayleigh step 9A is generated, as indicated by an arrow H10, as for the sealing target liquid F on the surface side facing the rotating seal ring 20. Meanwhile, as for the sealing target liquid F on the bottom surface side as compared with the bottom surface of the Rayleigh step 9A, the flow that is indicated by an arrow H11 and to move to the sealing target liquid side along the boundary wall 18 inclined to the Rayleigh step 9A side with reference to the radial direction is generated while the step 18b blocks infiltration into the Rayleigh step 9A as indicated by the arrow H11. By riding this flow indicated by the arrow H11, the contamination C mixed in the vicinity of the opening portion 152a of the introduction groove portion 152 is discharged to the sealing target liquid side of the introduction groove portion 152. As described above, most of the contamination C is discharged to the outside of the introduction groove portion 152 without being mixed into the Rayleigh step 9A, and yet the contamination C goes over the land 12 from the wall portion 9a and is discharged along the boundary wall 18 formed in the introduction groove portions 152 arranged side by side downstream of the Rayleigh step 9A even in a case where a very small amount of the contamination C is mixed into the Rayleigh step 9A.

Although embodiments of the present invention have been described above with reference to the drawings, the specific configuration is not limited to the embodiments and any change or addition within the scope of the gist of the present invention is included in the present invention.

For example, although the mechanical seal for general industrial machine has been described as an example of the sliding component in the above embodiments, the mechanical seal may be replaced with another mechanical seal for an automobile, a water pump, or the like. In addition, the present invention is not limited to the mechanical seal and may be a sliding component other than a mechanical seal, examples of which include a slide bearing.

In addition, although an example in which the dynamic pressure generation mechanism is provided only on the stationary seal ring has been described in the above embodiment, the dynamic pressure generation mechanism may be provided only on the rotating seal ring 20 or on both the stationary and rotating seal rings.

In addition, although a mode in which the sliding component is provided with a plurality of dynamic pressure generation mechanisms having the same shape has been exemplified in the above embodiment, a plurality of dynamic pressure generation mechanisms having different shapes may be provided. In addition, the interval, quantity, and so on of the dynamic pressure generation mechanisms can be changed as appropriate.

REFERENCE SIGNS LIST

1 Rotary shaft
2 Sleeve
4 Housing
5 Seal cover
7 Bellows
9A Rayleigh step (dynamic pressure generation groove portion)
10 Stationary seal ring (sliding component)
11 Sliding surface
12 Land
14 Dynamic pressure generation mechanism
15 Introduction groove portion
15a Opening portion
18 Boundary wall
18a Inclined surface
19 Annular groove
20 Rotating seal ring
21 Sliding surface
91A Rayleigh step (dynamic pressure generation groove portion)
181 Boundary wall
181a Inclined surface
181b Step (radial surface)

The invention claimed is:

1. A pair of sliding components which slidably rotate relative to each other and are formed in an annular shape, the sliding components having sliding surfaces formed in end surfaces of the sliding components facing to each other in an axial direction, respectively, wherein the sliding surface of one of the sliding components is provided with a plurality of dynamic pressure generation mechanisms circumferentially arranged, each of the dynamic pressure generation mechanisms including an introduction groove portion communicating with a sealed fluid side of the sliding surface of the one of the sliding components through an opening portion of the introduction groove portion and a dynamic pressure generation groove portion that generates a dynamic pressure, that has a communication end portion communicating with the introduction groove portion and a closed end portion opposed to the communication end portion in the axial direction and that extends in a circumferential direction, the dynamic pressure generation groove portion is isolated, throughout a circumferential length thereof, from the sealed fluid side of the sliding surface of the one of the sliding components by a land, the introduction groove portion is partially defined by a first wall surface which is formed on a side adjacent to the dynamic pressure generation groove portion communicating with the introduction groove portion and a second wall surface which is opposed to the first wall surface in the circumferential direction, the first wall surface includes a first inclined surface which is formed on the sealed fluid side and on a side of the opening portion of the introduction groove portion, and which is inclined with respect to a radial direction such that an edge of the first inclined surface on the sealed fluid side is close to the dynamic pressure generation groove portion, the first wall surface further includes a radial surface which is formed on a leakage side to be continuous to the first inclined surface and which extends in parallel to the radial direction, the second wall surface includes a second inclined surface which is formed on the sealed fluid side and on a side of the opening portion of the introduction groove portion, and which is inclined with respect to the radial direction such that an edge of the second inclined surface on the sealed fluid side is close to the first inclined surface, the second wall surface further includes a radial surface which is formed on a leakage side to be continuous to the second inclined surface and which extends in parallel to the radial direction, and the sliding surface of one of the sliding components between adjoining two of the dynamic pressure generation mechanisms is formed to be grooveless.

2. The pair of sliding components according to claim 1, wherein the first inclined surface is formed of a flat surface from the side of the dynamic pressure generation groove portion toward the sealed fluid side.

3. The pair of sliding components according to claim 1, wherein the introduction groove portions arranged in the circumferential direction mutually communicate via an endlessly extending annular groove formed in the sliding surface.

4. The pair of sliding components according to claim 2, wherein the introduction groove portions arranged in the circumferential direction mutually communicate via an endlessly extending annular groove formed in the sliding surface.

5. A pair of sliding components which slidably rotate relative to each other and are formed in an annular shape, the sliding components having sliding surfaces formed in end surfaces of the sliding components facing to each other in an axial direction, respectively, wherein the sliding surface of one of the sliding components is provided with a plurality of dynamic pressure generation mechanisms circumferentially arranged, each of the dynamic pressure generation mechanisms including an introduction groove portion communicating with a sealed fluid side of the sliding surface of the one of the sliding components through an opening portion of the introduction groove portion and a dynamic pressure generation groove portion that generates a dynamic pressure, that has a communication end portion communicating with the introduction groove portion and a closed end portion opposed to the communication end portion in the axial direction and that extends in a circumferential direction, the dynamic pressure generation groove portion is isolated, throughout a circumferential length thereof, from the sealed fluid side of the sliding surface of the one of the sliding components by a land, the introduction groove portion is partially defined by a first wall surface which is formed on a side adjacent to the dynamic pressure generation groove portion communicating with the introduction groove portion and a second wall surface which is opposed to each other in the circumferential direction, the first wall surface includes a first inclined surface which is formed on a side of the opening portion of the introduction groove portion, and which is inclined with respect to a radial direction such that an edge of the first inclined surface on the sealed fluid side is close to the dynamic pressure generation groove portion, the second wall surface includes a second inclined surface which is formed on a side of the opening portion of the introduction groove portion, and which is inclined with respect to the radial direction such that an edge of the second inclined surface on the sealed fluid side is close to the first inclined surface, an inclination angle of the second wall surface with respect to the radial direction is larger than an inclination angle of the first wall surface with respect to the radial direction such that a circumferential width of the introduction groove portion becomes smaller from the leakage side toward the sealed fluid side, and the introduction groove portions arranged in the circumferential direction mutually communicate via an endlessly extending annular groove formed in the sliding surface.

6. The pair of sliding components according to claim 5, wherein the first inclined surface is formed of a flat surface from the side of the dynamic pressure generation groove portion toward the sealed fluid side.

* * * * *